United States Patent
Zagorski

(10) Patent No.: US 9,290,174 B1
(45) Date of Patent: Mar. 22, 2016

(54) METHOD AND SYSTEM FOR MITIGATING THE EFFECTS OF AN IMPAIRED DRIVER

(71) Applicant: GM GLOBAL TECHNOLOGY OPERATIONS LLC, Detroit, MI (US)

(72) Inventor: Chad T. Zagorski, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/521,623

(22) Filed: Oct. 23, 2014

(51) Int. Cl.
*B60W 30/09* (2012.01)
*B60W 40/09* (2012.01)
*B60K 28/06* (2006.01)
*B60W 30/00* (2006.01)
*B60W 40/08* (2012.01)

(52) U.S. Cl.
CPC .............. *B60W 30/00* (2013.01); *B60W 30/09* (2013.01); *B60K 28/06* (2013.01); *B60W 2040/0818* (2013.01); *B60W 2520/10* (2013.01); *B60W 2540/26* (2013.01); *B60W 2550/10* (2013.01); *B60W 2550/12* (2013.01)

(58) Field of Classification Search
CPC ................ B60W 30/00; B60W 30/09; B60W 2040/0818; B60W 2040/0827; B60W 2540/26; B60W 2550/402; B60W 2550/10; B60W 2550/12; B60W 2520/10; B60K 28/06; B60K 28/066
See application file for complete search history.

(56) References Cited

U.S. PATENT DOCUMENTS

| | | | |
|---|---|---|---|
| 6,950,027 B2 * | 9/2005 | Banas | 340/576 |
| 7,639,148 B2 * | 12/2009 | Victor | 340/576 |
| 8,170,739 B2 | 5/2012 | Lee | |
| 8,190,330 B2 | 5/2012 | Lee | |
| 8,564,424 B2 | 10/2013 | Evarts et al. | |
| 8,670,903 B2 | 3/2014 | Lee et al. | |
| 8,725,311 B1 | 5/2014 | Breed | |
| 2008/0091318 A1 | 4/2008 | Deng et al. | |
| 2008/0252466 A1 * | 10/2008 | Yopp et al. | 340/576 |
| 2010/0295707 A1 * | 11/2010 | Bennie et al. | 340/988 |
| 2011/0037595 A1 | 2/2011 | Kapuria et al. | |
| 2011/0109462 A1 * | 5/2011 | Deng et al. | 340/575 |
| 2012/0283911 A1 | 11/2012 | Lee et al. | |
| 2014/0249717 A1 | 9/2014 | Takahashi et al. | |
| 2015/0066284 A1 * | 3/2015 | Yopp | 701/29.2 |

FOREIGN PATENT DOCUMENTS

EP    2755192 A1    7/2014

* cited by examiner

*Primary Examiner* — Michael J Zanelli
(74) *Attorney, Agent, or Firm* — Reising Ethington, P.C.; Lionel D. Anderson

(57) ABSTRACT

A system and method that, in response to the detection of an impaired driver, develops a scenario-dependent response with an escalating sequence of awakening actions and/or automated driving actions that are designed to mitigate the effects of impaired driving for that particular driving scenario. Some examples of awakening actions include visual, audible, haptic and/or miscellaneous warnings intended to awaken or reengage the impaired driver. If the awakening actions are ineffective, one or more automated driving actions may be used to control certain aspects of vehicle braking, steering, accelerating, etc. The scenario-dependent response is at least partially based on the state, conditions and/or environment in and around the host vehicle (i.e., the current driving scenario) and may take into account factors such as: vehicle dynamics, road characteristics, pedestrian and vehicle traffic conditions, weather conditions and more.

21 Claims, 5 Drawing Sheets

METHOD AND SYSTEM FOR MITIGATING THE EFFECTS OF AN IMPAIRED DRIVER

FIELD

The present invention generally relates to a system and method for addressing the effects of impaired driving, and more particularly, to a system and method that use a scenario-dependent response to mitigate the potential impact of impaired driving.

BACKGROUND

When a driver is tired or is otherwise impaired, it may be appropriate to provide the driver with some type of warning and, when such a warning is insufficient, to actually perform some combination of automated driving actions in order to operate the vehicle in a safe manner. Those skilled in the art will recognize that not all driving scenarios are the same and, thus, a customized combination of warnings and/or automated driving actions specifically developed for the current driving scenario may be needed to help mitigate the effects of the impaired driving.

Some driving scenarios, such as driving on a busy two-lane surface street during rush hour with numerous pedestrians in the area, have a greater potential for a collision than others, like driving on an empty six-lane highway in the middle of the night. A combination of warnings and/or automated driving actions designed for the first scenario may not be optimal or appropriate for the second scenario and vice-versa. Accordingly, it may be desirable to develop a customized, scenario-dependent response having a specific combination of warnings and/or automated driving actions in order to best address the current driving scenario, as not all scenarios are the same.

SUMMARY

According to one embodiment, there is provided a method for use with a vehicle control system that is installed on a host vehicle and has one or more vehicle sensor(s), one or more environment sensor(s), and a control module. The method may comprise the steps of: detecting an impaired driver; gathering sensor readings from at least one of the vehicle sensor(s) or the environment sensor(s) at the control module; using the control module and sensor readings from at least one of the vehicle sensor(s) or the environment sensor(s) to develop a scenario-dependent response to the impaired driver, wherein the scenario-dependent response includes at least one awakening action or automated driving action that is customized to address a current driving scenario and to mitigate the effects of the impaired driver; and performing the scenario-dependent response.

According to another embodiment, there is provided a method for use with a vehicle control system that is installed on a host vehicle and has one or more vehicle sensor(s), one or more environment sensor(s), and a control module. The method may comprise the steps of: detecting an impaired driver; gathering sensor readings from at least one of the vehicle sensor(s) or the environment sensor(s) at the control module; using the control module and sensor readings from at least one of the vehicle sensor(s) or the environment sensor(s) to make adjustments to a scenario indicator code that is representative of certain aspects of the current driving scenario; using the scenario indicator code to develop a scenario-dependent response to the impaired driver that includes an escalating sequence of awakening actions designed to engage the impaired driver and automated driving actions designed to mitigate the effects of the impaired driver; and performing the scenario-dependent response.

According to another embodiment, there is provided a vehicle control system installed on a host vehicle. The system may comprise: one or more vehicle sensor(s) configured to provide vehicle sensor readings; one or more environment sensor(s) configured to provide environment sensor readings; one or more output device(s) configured to receive command signals and to initiate a scenario-dependent response when an impaired driver is detected; and a control module coupled to the vehicle sensor(s) for receiving the vehicle sensor readings, the environment sensor(s) for receiving the environment sensor readings, and the output device(s) for providing the command signals. The control module is configured to develop a scenario-dependent response to the impaired driver and to initiate the scenario-dependent response with the command signals provided to the output device(s), and the scenario-dependent response includes at least one awakening action or automated driving action that is customized to address a current driving scenario and to mitigate the effects of the impaired driver.

DRAWINGS

Preferred exemplary embodiments will hereinafter be described in conjunction with the appended drawings, wherein like designations denote like elements, and wherein.

DESCRIPTION

If a drowsy or otherwise impaired driver is detected, the system and method described herein may develop a scenario-dependent response that uses an escalating sequence of awakening actions and/or automated driving actions to mitigate the effects of the impaired driving and is specifically designed for that particular driving scenario. Some examples of awakening actions that may be employed include audible, haptic and/or visual warnings designed to awaken or reengage the impaired driver. If such awakening actions are ineffective, one or more automated driving actions may be used to control certain aspects of vehicle braking, steering, accelerating, etc. As mentioned above, the present system and method may perform a "scenario-dependent response," which means that the response is at least partially based on the state, conditions and/or environment in and around the host vehicle (i.e., the current driving scenario) and may take into account factors such as, but not limited to: vehicle dynamics, road characteristics, pedestrian and vehicle traffic conditions, weather conditions, lighting conditions, time of day and more. Using these factors, it is possible for the system and method to develop and carry out a scenario-dependent response that is customized or tailored to address the effects of the impaired driving in the current driving scenario.

Figure 1:
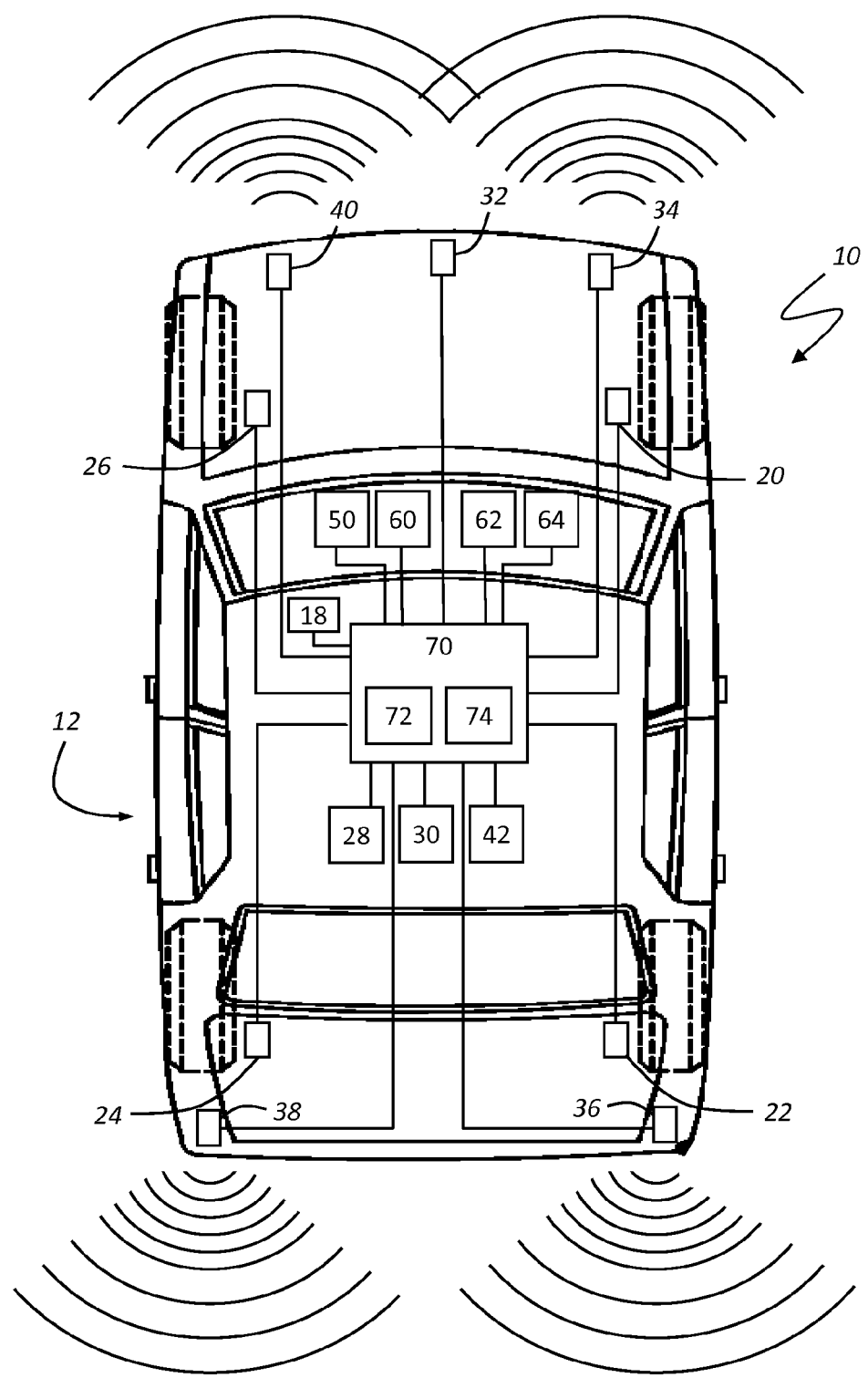
FIG. 1 is a schematic view of a host vehicle having an exemplary vehicle control system in accordance with one embodiment.

With reference to FIG. 1, there is shown a schematic representation of an exemplary host vehicle 10 equipped with a vehicle control system 12 capable of developing and performing the scenario-dependent response described herein. It should be appreciated that the vehicle control system and method may be used with any type of vehicle, including traditional passenger vehicles, sports utility vehicles (SUVs), cross-over vehicles, trucks, vans, buses, recreational vehicles (RVs), motorcycles, etc. These are merely some of the possible applications, as the vehicle control system and method described herein are not limited to the exemplary embodiment shown in FIG. 1 and could be implemented with any number of different vehicles. According to one embodiment, vehicle control system 12 includes driver sensors 18, vehicle sensors 20-28, environment sensors 30-42, warning devices 50, and control modules 60-64 and 70.

Any number of different sensors, components, devices, modules, systems, etc. may provide the vehicle control system 12 with information, data and/or other input. These include, for example, the exemplary components shown in FIG. 1, as well as others that are known in the art but are not shown here. It should be appreciated that the driver sensors, vehicle sensors, environment sensors, control modules, warning devices, as well as any other component that is a part of and/or is used by the vehicle control system 12 may be embodied in hardware, software, firmware or some combination thereof. These components may directly sense or measure the conditions for which they are provided, or they may indirectly evaluate such conditions based on information provided by other sensors, components, devices, modules, systems, etc. Furthermore, these components may be directly coupled to the control module 70, indirectly coupled via other electronic devices, a vehicle communications bus, network, etc., or coupled according to some other arrangement known in the art. These components may be integrated within another vehicle component, device, module, system, etc. (e.g., sensors that are already a part of an engine control module (ECM), traction control system (TCS), electronic stability control (ESC) system, antilock brake system (ABS), etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable arrangement or architecture may be used to carry out the method described herein. In a preferred embodiment, the vehicle control system 12 is an active safety system and the control module 70 is some type of active safety control module or controller, but this is not required.

The driver sensors 18 may include any type of sensing or other component that provides the present system and method with data or information regarding the behavior, state and/or condition of the driver so that the system and method can detect when the driver is drowsy or impaired. It should be appreciated that any type of known technique for detecting driver impairment may be employed, including those that utilize driver sensors 18 that are mounted within the vehicle cabin and are trained or focused on the driver. Driver sensors 18 may include cameras that capture and evaluate images of the driver's face in order to look for slackening facial muscles, the frequency and duration of eye closure, the orientation of the head, etc., and provide corresponding driver readings to the system 12. It is also possible for the driver sensors 18 to include sensors in the driver's seat or in the steering wheel. In other examples, driver impairment is determined not by directly monitoring the face or body of the driver, but by evaluating the behavior of the driver and looking for signs of impairment such as lane departure, inconsistent vehicle speed, erratic driving, etc. Because the system and method described herein may use any type of suitable means for detecting a drowsy or otherwise impaired driver, driver sensors 18 are deemed optional.

The vehicle sensors 20-28 may include any type of sensing or other component that provides the present system and method with data or information regarding the performance, state and/or condition of the host vehicle 10. According to the non-limiting example shown in FIG. 1, the vehicle sensors include speed sensors 20-26 and a dynamic sensor unit 28.

The speed sensors 20-26 provide the system 12 with speed readings that are indicative of the rotational speed of the wheels, and hence the overall speed or velocity of the vehicle. In one embodiment, individual wheel speed sensors 20-26 are coupled to each of the vehicle's four wheels and separately provide speed readings indicating the rotational velocity of the corresponding wheel (e.g., by counting pulses on one or more rotating wheel(s)). Skilled artisans will appreciate that these sensors may operate according to optical, electromagnetic or other technologies, and that speed sensors 20-26 are not limited to any particular speed sensor type. In another embodiment, the speed sensors could be coupled to certain parts of the vehicle, such as an output shaft of the transmission or behind the speedometer, and produce speed readings from these measurements. It is also possible to derive or calculate speed readings from acceleration readings (skilled artisans appreciate the relationship between velocity and acceleration readings). In another embodiment, speed sensors 20-26 determine vehicle speed relative to the ground by directing radar, laser and/or other signals towards the ground and analyzing the reflected signals, or by employing feedback from a navigation unit that has Global Positioning System (GPS) capabilities. It is possible for the speed readings to be provided to the system 12 by some other module, subsystem, system, etc., like a powertrain control module or a brake control module. Any other known speed sensing techniques may be used instead.

Dynamic sensor unit 28 provides the system with dynamic readings that pertain to the various dynamic conditions occurring within the vehicle, such as acceleration and yaw rate. Unit 28 may include any combination of sensors or sensing elements that detect or measure vehicle dynamics, and may be packaged separately or in a single unit. According to one exemplary embodiment, dynamic sensor unit 28 is an integrated inertial measurement unit (IMU) that includes a yaw rate sensor, a lateral acceleration sensor, and a longitudinal acceleration sensor. Some examples of suitable acceleration sensor types include micro-electromechanical system (MEMS) type sensors and tuning fork-type sensors, although any type of acceleration sensor may be used. Depending on the particular needs of the system, the acceleration sensors may be single- or multi-axis sensors, may detect acceleration and/or deceleration, may detect the magnitude and/or the direction of the acceleration as a vector quantity, may sense or measure acceleration directly, may calculate or deduce acceleration from other readings like vehicle speed readings, and/or may provide the g-force acceleration, to cite a few possibilities. Although dynamic sensor unit 28 is shown as a separate unit, it is possible for this unit or elements thereof to be integrated into some other unit, device, module, system, etc.

Of course, other vehicle sensors could be used in addition to or in lieu of those described above. Some potential examples include steering angle sensors, accelerator and brake pedal sensors, stability sensors, and gear selection sensors, to cite just a few.

Environment sensors 30-42 may include any type of sensing or other component that provides the present system and method with data or information regarding the environment or area in which the host vehicle 10 is operating. Some examples of potential environment sensors include a navigation unit 30, lane sensor 32, object sensors 34-40 and ambient sensor 42.

Navigation unit 30 provides the system 12 with navigation readings that represent the location or position of the host vehicle 10 and/or roads in the vicinity of the host vehicle. Depending on the particular embodiment, navigation unit 30 may be a stand-alone component or it may be integrated within some other component or system within the vehicle. The navigation unit may include any combination of other components, devices, modules, etc., like a GPS unit or a memory device with stored map data, and may use the current position of the host vehicle and road- or map-data to evaluate upcoming road segments. For instance, navigation unit 30 may provide information regarding road conditions, such as road geometry (e.g., curved, straight, forked, number and width of lanes, whether the road is a primary or secondary road, etc.), nearby road features (e.g., guard rails, barriers, shoulders, bridges, entrance and exit ramps, etc.), as well as traffic conditions (e.g., lane closures, road construction, accidents, heavy traffic flows, speed limits and actual traffic speeds, etc.). Navigation unit 30 may further provide information regarding the surrounding geographical area, such as whether the host vehicle 10 is in an urban, rural, or suburban area. It is also possible for navigation unit 30 to have some type of user interface so that information can be verbally, visually or otherwise exchanged between the unit and the driver. The navigation unit 30 can store pre-loaded map data and the like, or it can wirelessly receive such information through a telematics unit or some other communications device, to cite two possibilities. Any suitable navigation unit 30 may be used, as the present system and method are not limited to any particular type.

Lane sensor 32 provides the system 12 with lane readings regarding the position of the host vehicle 10 relative to the road. For example, lane sensor 32 could provide information regarding the position of the host vehicle relative to various road indicia including lane markers, solid lines, dashed lines, double lines, reflectors, etc., and could alert the system when the host vehicle 10 is drifting out of or otherwise departing its current lane. Lane sensor 32 may be a single sensor or a combination of sensors, and may include one or more RADAR devices, laser devices, LIDAR devices, active infrared sensors that detect lane crossings by measuring the infrared LED light reflected by the road markings, standard visible spectrum perspective cameras, as well as other known devices or combinations thereof. The lane sensor 32 may be a stand-alone component, or it may be part of an integrated unit or module. Alternatively, the lane readings may be provided or supplemented by the object sensors, which are described in more detail below.

Object sensors 34-40 provide the system 12 with object readings that pertain to nearby vehicles, pedestrians, or other objects surrounding the host vehicle 10. The object readings can be representative of the presence, position, velocity, and/or acceleration of nearby vehicles, as well as of nearby pedestrians and other objects. These readings may be absolute in nature (e.g., an object velocity or acceleration relative to ground or some other frame of reference) or they may be relative in nature (e.g., an object velocity or acceleration relative to the host vehicle). The information from object sensors 34-40 may also be used instead of, or to otherwise supplement or corroborate, the readings provided by the navigation unit 30 and/or the lane sensor 32. Each of the object sensors may be a single sensor or a combination of sensors, and may include one or more RADAR devices, laser devices, LIDAR devices, ultrasound devices, vision devices (e.g., camera, etc.), vehicle-to-vehicle communications devices, devices for receiving communications from roadside beacons or sensors, other known devices or combinations thereof. According to an exemplary embodiment, object sensors 34 and 40 are forward-looking sensors that are mounted towards the front of the vehicle and are capable of monitoring areas that are generally ahead of and off to the side of the host vehicle 10, while object sensors 36 and 38 are rearward- or sideways-looking sensors that are mounted towards the rear or side of the vehicle and are able to monitor areas generally behind the vehicle or off to its side. Of course, the host vehicle 10 may include a combination of object sensors that differs from the exemplary combination shown in FIG. 1, as that embodiment is only meant to illustrate one possibility.

Ambient sensor 42 provides the system 12 with ambient readings regarding outside weather or other environmental conditions that could affect driving. For example, ambient sensor 42 may report an outside temperature, an outside humidity, current or recent data on precipitation, road conditions, or any other type of environmental readings. By knowing the outside temperature and the amount of recent precipitation, for instance, the present system and method may adjust the particular combination of awakening actions and/or automated driving actions in order to take into account slippery road surfaces and the like. The ambient sensor 42 may determine environmental conditions by directly sensing and measuring such conditions, indirectly determining environmental readings by gathering them from other modules or systems in the vehicle, or by receiving wireless transmissions that include weather reports, forecasts, etc. from a weather-related service or website.

The aforementioned driver sensors 18, vehicle sensors 20-28 and environment sensors 30-42, as well as other known sensors not listed herein, may provide input to the vehicle control system 12 in a manner that helps enable the method described below to generate and perform a scenario-dependent response with an escalating sequence of awakening actions and/or automated driving actions when a drowsy or impaired driver is detected. The description of the vehicle control system 12 now turns to various output devices, such as warning devices 50 and control modules 60-64, as well as control module 70 which can be used to carry out the present method.

Warning devices 50 may include any type of output device or other component that can be used to inform, alert and/or otherwise warn the driver when it is determined that the driver is drowsy or otherwise impaired. Some examples of potential warning devices include visual warning devices, audible warning devices, haptic warning devices and other miscellaneous warning devices, and each of these devices can receive control signals from the system 12 for their activation. As their name suggests, visual warning devices use visual alerts or awakening actions to try and rouse or engage the driver if the method determines that the driver is impaired. Some potential visual warning devices 50 include a graphic display unit, a driver information center, an infotainment unit, vehicle instrumentation and controls, and a heads-up-display unit, to cite a few of the possibilities. The present method can present visual warnings or awakening actions to the driver via each of the preceding devices, where such actions can simply be intended to get the attention of the driver or to actually convey a message. Audible warning devices are similarly intended to warn or issue awakening actions to the driver, but do so with the use of sounds, words, music or the like. For instance, an audible warning device could include a vehicle radio, an infotainment unit, as well as components that emit sounds such as chimes, bells or other audible alerts. Haptic warning devices rely on the sense of touch or feel to alert the driver and can issue awakening actions through vibrations or other mechanical disturbances in the steering wheel, safety belt, or seats, for example. As for miscellaneous warning devices, this group may include any other vehicle component or device that can be used to try and engage a driver or otherwise alert them of a potential impairment. For instance, miscellaneous warning devices could be in the form of a window regulator that automatically lowers a driver side window if the driver is thought to be drowsy, or interior vehicle lights which could be turned on or flashed as a possible alert. Other types of warning devices are certainly possible, as the present system and method are not limited to any particular ones.

Control modules 60-64 may include any control modules or units within the host vehicle 10 that can perform autonomous, semi-autonomous and/or other automated driving actions in response to control signals from system 12. "Automated driving action," as used herein, broadly means any driving-related action or function that is automatically taken by the host vehicle without driver request and includes actions falling within levels 1-4 of the National Highway Traffic Safety Administration (NHTSA) classification system. To illustrate, a powertrain or engine control module 60 may be used to automatically control the speed of the vehicle, while a brake control module 62 and a steering control module 64 can be used to control braking and steering, respectively. Other control modules may certainly be used, as the preceding examples are just meant to illustrate some of the possibilities. Skilled artisans will appreciate that it is possible for one or more of the control modules 60-64 to constitute or include some of the vehicle sensors described above. For instance, an engine control module 60 could operate as both a speed sensor (input device that provides the system with speed readings regarding engine and/or vehicle speed), as well as a control module (output device that controls engine and/or vehicle speed in response to control signals during an automated driving event). The same is true regarding the brake and steering control modules 62 and 64, in terms of acting as both input and output devices to vehicle control system 12.

Control module 70 is coupled to the driver sensors 18, the vehicle sensors 20-28, the environment sensors 30-42, the warning devices 50, and the various control modules 60-64 so that it can gather sensor readings from the sensors and provide command signals to the warning devices and control modules according to the present method. Control module 70 may include any variety of electronic processing devices, memory devices, input/output (I/O) devices, and/or other known components, and may perform various control and/or communication related functions. In an exemplary embodiment, control module 70 is some type of active safety control module and includes an electronic memory device 72 that stores sensor readings (e.g., sensor readings from sensors 18, 20-28 and 30-42), look up tables or other data structures, algorithms (e.g., the algorithm embodied in the exemplary method described below), etc. Control module 70 also includes an electronic processing device 74 (e.g., a microprocessor, a microcontroller, an application specific integrated circuit (ASIC), etc.) that executes instructions for software, firmware, programs, algorithms, scripts, etc. that are stored in memory device 72 and may partially govern the processes and methods described herein.

Depending on the particular embodiment, the control module 70 may be a stand-alone vehicle electronic module (e.g., a safety controller, a sensor controller, etc.), may be incorporated or included within another vehicle electronic module (e.g., an automated driving control module, an active safety control module, a brake control module, a steering control module, a powertrain control module, etc.), or may be part of a larger network or system (e.g., an automated driving system, an adaptive cruise control system, a lane departure warning system, an active safety system, a traction control system (TCS), an electronic stability control (ESC) system, an antilock brake system (ABS), etc.), to name a few possibilities. Accordingly, the control module 70 is not limited to any one particular embodiment or arrangement and may be used by the present method to control one or more aspects of vehicle operation.

Any of the aforementioned control modules may include a combination of electronic processing devices, memory devices, input/output (I/O) devices, and other known components, and they may be electronically connected to other vehicle devices and modules via a suitable vehicle communications network, and may interact with them when required. It should be appreciated that the basic architecture, structure and overall arrangement of such control modules are well known in the art and are, therefore, not described here in further detail.

Figure 2:
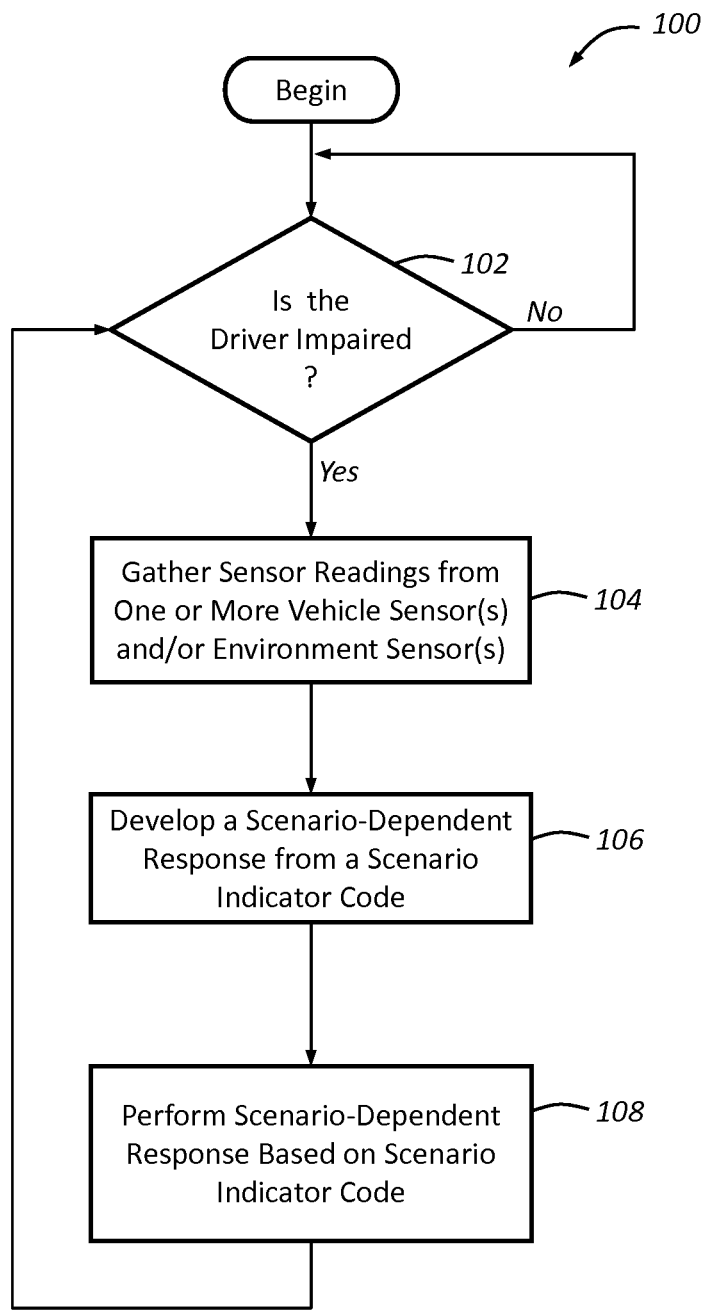
FIG. 2 is a flowchart illustrating an exemplary method for operating a vehicle control system, such as the system shown in FIG. 1.

Turning now to FIG. 2, there is shown an embodiment of a scenario-dependent operating method 100 for a vehicle control system, such as system 12 shown in FIG. 1. If an impaired driver is detected, the method 100 may develop and implement a scenario-dependent response with a series of escalating awakening actions and/or automated driving actions that are designed to address the particular driving scenario or environment surrounding the host vehicle. According to one embodiment, the scenario-dependent response is influenced by some combination of readings from driver sensors 18, vehicle sensors 20-28 and/or environment sensors 30-42, and results in commands signals that are sent to some combination of warning devices 50 and/or control modules 60-64. Although the following description is provided in the context of vehicles equipped with autonomous, semi-autonomous and/or other automated driving capabilities, the method 100 may also be used with vehicles lacking such features. For example, if an impaired driver is detected, the method 100 could perform a scenario-dependent response that includes activating the hazard lights in lieu of initiating an automated driving action, such as lane centering. Accordingly, the present method is not limited to scenario-dependent responses having a particular set of remedial actions.

Beginning with step 102, the method determines whether the driver of the host vehicle is impaired, and may do so in any number of different ways. An impaired driver may be a sleepy or drowsy driver, an injured or debilitated driver, or an intoxicated driver, for example. Step 102 may employ any known method or technique for detecting an impaired driver, including techniques that rely on driver readings from driver sensors 18 to capture and evaluate images of the driver's face in order to look for slackening facial muscles, to evaluate the frequency, duration and/or pattern of eye closure, to examine the orientation or movement of the driver's head or body, or to monitor the direction or pattern of the driver's gaze, to cite a few possibilities. Movement of the driver may also be monitored by sensors located in the driver's seat to detect driver position, as well as sensors in the steering wheel to monitor the driver's hand position. In other examples, driver impairment is determined not by directly monitoring the face or body of the driver, but by evaluating the behavior or performance of the driver and looking for signs of impairment such as lane departure, inconsistent vehicle speed, erratic driving, etc. According to one embodiment, step 102 receives driver readings from driver sensors 18 at control module 70 and uses these readings, possibly in conjunction with readings from other sensors, to determine if the driver is impaired and issues a corresponding true/false or yes/no signal (typically, this process takes between 1-5 seconds). Instead of issuing a binary indication of impairment, step 102 could alternatively issue a quantitative or qualitative ranking or measure of perceived impairment. Again, it is not imperative for step 102 to utilize any particular driver impairment detection technique, as any suitable technique will suffice, including any of the techniques taught in EP 2755192 A1, US 2011/0037595, U.S. Pat. No. 8,725,311 and U.S. Pat. No. 8,564,424. If step 102 determines that the driver is not impaired, the method simply loops back and continues monitoring for driver impairment. If the driver is impaired, then the method continues on to step 104.

Next, step 104 gathers sensor readings from one or more vehicle sensor(s) and/or environmental sensor(s). These sensor readings help the method to establish a current driving scenario, which refers to the state, conditions and/or environment in and around the host vehicle and may take into account factors such as, but not limited to: vehicle dynamics, road characteristics, pedestrian and vehicle traffic conditions, weather conditions and more. Establishing a full and accurate picture of the driving scenario helps the method better develop a tailored or customized scenario-dependent response to address the driver impairment, as will be explained in further detail. Step 104 can receive one or more sensor readings from vehicle sensors 20-28 and environment sensors 30-42 at control module 70 over a suitable vehicle communications network, like a central communications bus. More particularly, step 104 may gather some combination of: speed readings indicating vehicle speed from the speed sensors 20-26, dynamic readings indicating vehicle dynamics like acceleration and yaw rate from the dynamic sensor unit 28, navigation readings from the navigation unit 30 providing the current location of the vehicle, lane readings indicating the current position of the vehicle relative to lanes or boundaries on the road from lane sensor 32, object readings from object sensors 34-40 representing the presence of surrounding objects like other vehicles and pedestrians, and ambient readings from ambient sensor 42 pertaining to current atmospheric or environmental conditions outside of the vehicle.

In one example, step 104 gathers navigation readings from navigation unit 30 to determine characteristics of the current road segment and object readings from one or more object sensor(s) 34-40 to determine the concentration of other vehicles or pedestrians in the area of the host vehicle. Some road segment characteristics that the present method may take into account include: how many lanes does the road have, is the road straight or curved, is the road a highway or a surface street with numerous traffic lights, does the road traverse an open plain or a narrow bridge, etc.; such information may be gleaned from the navigation readings. The concentration or abundance of objects provides the method with an indication as to whether the host vehicle is currently traveling in a high object density area, such as a busy urban street during rush hour, or in a low object density area, like a rural highway at night time; this information can be determined from the object sensor(s) 34-40. Again, the present method is not limited to any particular combination of sensor readings, as various combinations may be used to establish an accurate driving scenario.

Step 106 then develops or generates a scenario indicator code. A "scenario indicator code," as used herein, broadly refers to a numerical or non-numerical code or value that is representative of certain aspects of the current driving scenario and is at least partially based on one or more of the previously gathered sensor readings. Myriad ways exist for developing scenario indicator codes, including the two non-limiting examples shown in FIGS. 3 and 4, each of which uses a different approach for evaluating and quantifying the current driving scenario or environment of the host vehicle.

Figure 3:
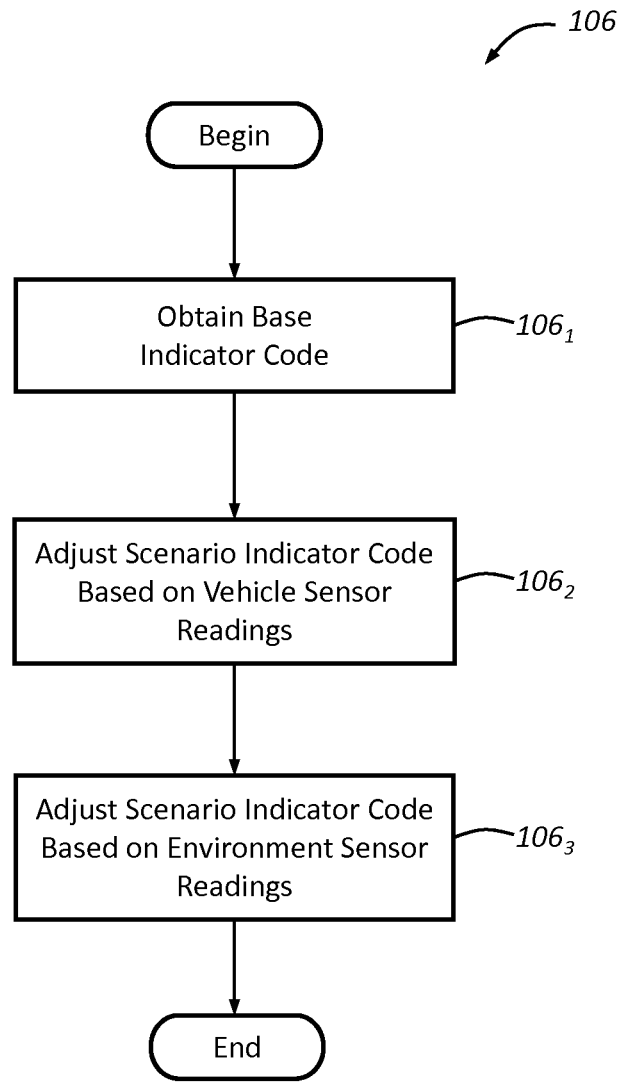
FIG. 3 is a flowchart illustrating an exemplary embodiment of a developmental step of the method illustrated in FIG. 2.

Starting with FIG. 3, there is shown a first potential embodiment of step 106 that includes a number of sub-steps $106_1$-$106_3$. In sub-step $106_1$, the method retrieves or otherwise obtains a base indicator code, which can act as a starting or default indicator code. The base indicator code can be a multi-digit string (e.g. a 6-bit string), a single-digit numerical value, or some other type of numerical or non-numerical code. Furthermore, it is possible for the base indicator code to be the same each time step 106 is performed or for it to vary between successive computational cycles; that is, for the code to be iterative. For instance, the base indicator code may be affected by previous driving behaviors or patterns. In one particular example, if a driver is habitually driving while impaired, a multi-digit base indicator code may incorporate or start with certain flags or bits already set, as opposed to a driver who rarely drives impaired, in which case a multi-digit base indicator code may not incorporate any pre-set flags in step $106_1$. In another example, the time of day or even the day of the week could be factor in establishing a base indicator code or in adjusting a scenario indicator code (e.g., if a driver who normally does not operate the host vehicle at 3 a.m. is driving, then this would be reflected or taken into account in the base and/or scenario indicator code). It is possible for the base indicator code, along with other codes and data used by the present method, to be stored in electronic memory 72 or elsewhere in vehicle control system 12.

Sub-steps $106_2$-$106_3$ involve adjusting or changing the scenario indicator code based on the various sensor readings previously obtained in step 104. For example, sub-step $106_2$ can adjust the scenario indicator code based on vehicle sensor readings, such as those obtained from vehicle sensors 20-28, while sub-step $106_3$ can make modifications to the scenario indicator code based on environment sensor readings, like those provided by environment sensors 30-42. More particularly, it is possible for step $106_2$ to use speed readings from speed sensors 20-26 and/or dynamic readings from dynamic sensor unit 28 in order to adjust the scenario indicator code to take into account the current speed, acceleration and/or other performance characteristics of the host vehicle 10. The driving scenario is different when, for example, the host vehicle is traveling at 15 mph versus when it is traveling at 75 mph, and step $106_2$ may be used to take such differences into account.

Similarly, step $106_3$ can use navigation readings from navigation unit 30 to take into account different characteristics of the current road segment and object readings from one or more object sensor(s) 34-40 to detect the concentration of other vehicles or pedestrians in the area of the host vehicle. As with the vehicle speed example above, an urban surface street with stoplights and a dense population of vehicles and pedestrians presents a much different driving scenario than a straight rural highway that has few objects around. Any suitable combination of sensor readings may be used to adjust the base indicator code, as it may only be adjusted in response to vehicle sensor readings, only in response to environment sensor readings, or in response to a combination thereof. In some instances, it may even be appropriate to leave the base indicator code untouched and not adjust it at all.

The following non-limiting example uses a single-digit scenario indicator code where the greater the likelihood of a collision and/or the higher the potential severity of such a collision, the greater the scenario indicator code. In such an example, the present method may provide more time to wake up or reengage the driver with alerts if the scenario indicator code is below a certain threshold and take more aggressive automated driving actions to intervene if the scenario indicator code is above a certain threshold. Assuming that the scenario indicator code is a numerical code that starts at the base indicator code value (e.g., zero), steps $106_2$ and $106_3$ can adjust the scenario indicator code by adding numbers thereto and/or subtracting numbers therefrom. To illustrate, if the dynamic sensor unit 28 indicates that an acceleration of the vehicle is above a certain threshold, the scenario indicator code may be increased by a certain number; if the acceleration is below the threshold, the scenario indicator code may be increased by a smaller number or it could even be decreased. Similarly, if the navigation unit 30 determines that the host vehicle is traveling on an urban street with numerous stop lights, as opposed to a rural highway, then sub-step $106_3$ may add a certain value to the scenario indicator code. In another example, sub-step $106_4$ can add a value to the scenario indicator code if the object sensors 20-26 indicate that the host vehicle is surrounded by a plurality of other vehicles. The preceding examples were only provided for purposes of illustration, as it should be understood that the particular combination and/or order of the various sub-steps in 106 may be changed.

Figure 4:
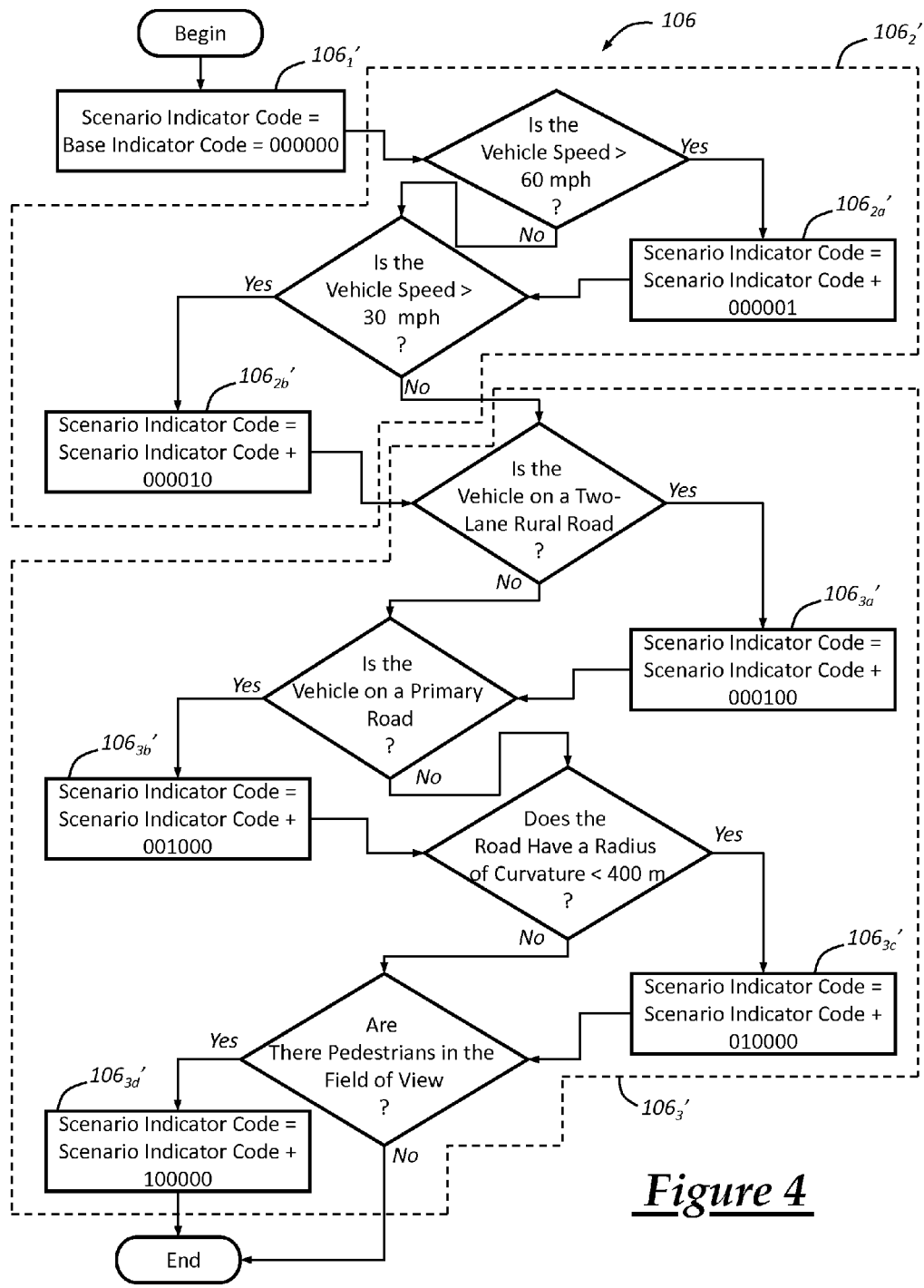
FIG. 4 is a flowchart illustrating another exemplary embodiment of the developmental step of the method illustrated in FIG. 2.

Turning now to FIG. 4, this flowchart illustrates another potential embodiment for step 106. Similar to FIG. 3, sub-step $106_1'$ involves obtaining a base indicator code and initially establishing the scenario indicator code; sub-step $106_2'$ involves adjusting the scenario indicator code based on vehicle sensor readings; and sub-step $106_3'$ involves adjusting the scenario indicator code based on various environment sensor readings. In this particular embodiment, sub-step $106_1'$ obtains a base indicator code in the form of a multi-bit string (e.g., a six-bit string 000000 retrieved from electronic memory 72 or elsewhere) and initially sets the scenario indicator code to the base indicator code. Each bit or group of bits in the string can be representative of a characteristic or attribute of the current driving scenario such that the string has a meaningful number format, somewhat akin to a VIN or product number.

Sub-step $106_2'$ then adjusts the scenario indicator code based on one or more vehicle sensor readings, such as speed readings from speed sensors 20-26 and/or dynamic readings from dynamic sensor unit 28. For example, if the vehicle speed is greater than 60 mph based on sensor readings from speed sensors 20-26, the first bit of the code is incremented by 000001 at $106_{2a}'$ and then the second bit of the code is incremented by 000010 at $106_{2b}'$ so that the overall value of the scenario indicator code is 000011 before leaving step $106_2'$. If the vehicle speed is not greater than 60 mph, but is greater than 30 mph, the scenario indicator code is simply incremented by 000010 at $106_{2b}'$ so that the code is 000010 before leaving step $106_2'$. If the vehicle speed is less than 30 mph, the scenario indicator code is not incremented and remains 000000 at the conclusion of step $106_2'$. In this example, the first bit of the code is a "high speed" bit and the second bit is a "medium speed" bit. It should be understood that other vehicle sensor readings may be taken into account, such as readings or signals from any of the aforementioned sensors, and the number of bits and format of the code can be adjusted to accommodate the number of variables analyzed.

Sub-step $106_3'$ adjusts or otherwise modifies the scenario indicator code based on different environment sensor readings. For example, if the navigation unit 30, sensors 32-40 and/or some other vehicle mounted sensors indicate that the host vehicle 10 is traveling on a lightly trafficked rural road (e.g., a two-lane rural road), the third bit of the scenario indicator code is incremented by 000100 at $106_{3a}'$. Similarly, if the host vehicle is on a primary road such as a highway, the fourth bit of the scenario indicator code may be incremented by 001000 at $106_{3b}'$. Step 106 may also account for other road features or characteristics, such as road curvature, forks in the road, narrowing road sections, etc., because the presence of such features may require a more prompt or aggressive response by the present system and method. Accordingly, if the current or upcoming road segment has a radius of curvature less than a certain threshold (e.g., 400 meters), the scenario indicator code may be adjusted at $106_{3c}'$ in the form of an increment of 010000. In the preceding description of sub-step $106_3'$, environment sensor readings pertaining to various road characteristics were used to adjust or manipulate the third, fourth and fifth bits of the scenario indicator code such that these bits act as "rural road," "primary road" and "curved road" bits, respectively. In the following description of sub-step $106_3'$, other environment sensor readings relating to the presence and concentration of objects, such as nearby vehicles and pedestrians, are used to adjust the scenario indicator code.

This portion of sub-step $106_3'$ adjusts the environmental indicator code based on object readings from object sensors 34-40. If there are pedestrians in the field of view of the sensors, for example, the scenario indicator code may be adjusted by incrementing it 100000 at $106_{3d}'$. The method could adjust the code if there are any pedestrians present, if there are at least a certain number of pedestrians present, if there are pedestrians present within the roadway as opposed to being located on an adjacent sidewalk, or according to some other criteria. Moreover, if there are bike riders, other vehicles, or other objects that may pose a hazard to an impaired driver, it may be beneficial to similarly adjust the scenario indicator code so that the appropriate remedial action(s) may be taken in step 108, which will be described in more detail below. It should be understood that FIG. 4 is meant to be exemplary, and that other combinations, factors, code forms and formats, decrements as well as adjustments, etc. may be used. Step 106 is not limited to any particular manner of adjusting the scenario indicator code.

Returning now to FIG. 2, step 108 performs the scenario-dependent response in an effort to mitigate the effects of the impaired driver. Unlike other vehicle safety systems that perform various safety-related actions in response to an expected collision, step 108 is performed in response to the detection of an impaired driver, even when no collision is imminent or even likely. This distinction can have a significant effect on the remedial measures and other actions that are taken when the scenario-dependent response is being performed, as will be explained below.

The different types of remedial measures or actions that are taken during performance of the scenario-dependent response generally fall into two categories: awakening actions and automated driving actions. Awakening actions are designed to mitigate the effects of the impaired driving by alerting, rousing, awakening and/or otherwise engaging the driver and may include visual alerts, audible alerts, haptic alerts and miscellaneous alerts such as rolling down the windows, altering the temperature control settings, increasing a fan speed, and turning up the volume of a radio or infotainment unit, to cite a few examples. The preceding awakening actions may be carried out with control signals sent from control module 70 to one or more warning devices 50, for example.

Automated driving actions are also designed to mitigate the effects of the impaired driving, but are not necessarily intended to awaken the driver. Some non-limiting examples of automated driving actions include, but are not limited to, activating hazard lights to warn others and performing various autonomous and semi-autonomous driving functions that involve braking, steering, decelerating and/or a combination thereof, such as lane centering and automatically stopping the vehicle. Automated driving actions may include pre-activation actions where an active safety system, like a lane centering, collision imminent braking or stability control system, is sensitized during a warning phase before being activated. Some examples of automated driving actions that may be used as remedial actions for step 108 are disclosed in U.S. patent application Ser. No. 11/548,293 filed Oct. 11, 2006; Ser. No. 12/143,439 filed Jun. 20, 2008; Ser. No. 12/399,317 filed Mar. 6, 2009; Ser. No. 13/101,308 filed May 5, 2011; and Ser. No. 13/101,397 filed May 5, 2011, the relevant contents of which are all incorporated herein by reference. The aforementioned automated driving actions may be performed by sending control signals from control module 70 or some other device to one or more control modules 60-64.

Figure 5:
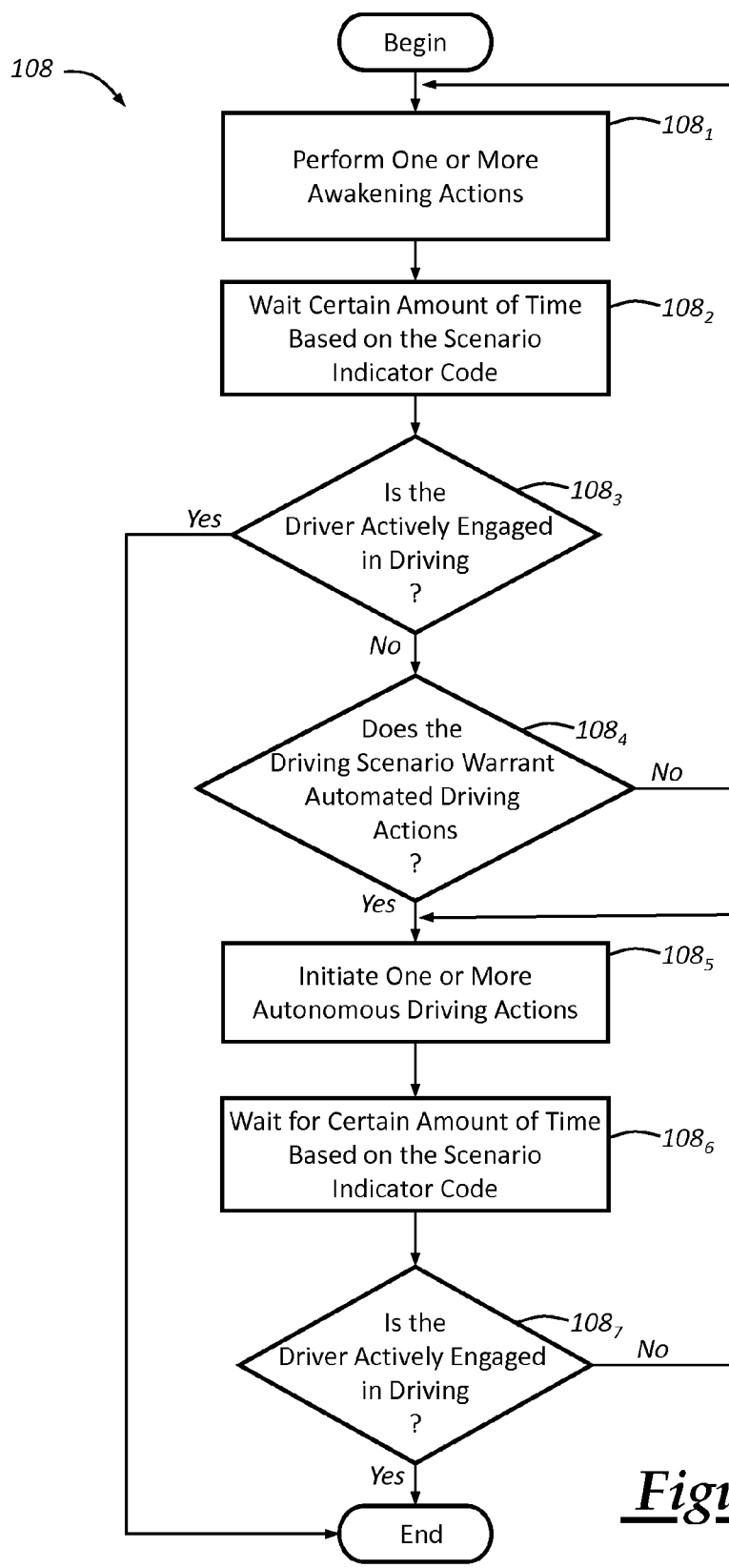
FIG. 5 is a flowchart illustrating an exemplary embodiment of a performance step of the method illustrated in FIG. 2.

In an exemplary embodiment, step 108 is performed according to the exemplary process illustrated in FIG. 5. Sub-step $108_1$ performs or carries out one or more awakening action(s) in an effort to awaken or rouse the presumably impaired driver. In accordance with one embodiment, a command signal is sent from the control module 70 to one or more warning devices 50, which in turn causes the device(s) to issue visual, audible, haptic alerts or warnings to the driver, as previously explained. The specific awakening action selected, as well as the particular manner in which it is performed, may be dictated by the scenario indicator code and can take into account any combination of the factors previously disclosed, as well as others. In some instances, the scenario indicator code may instruct the system to perform multiple awakening actions at once, such as turning up the volume of the vehicle's radio while concurrently rolling down the driver's window. If sensors in the passenger seat suggest the presence of a passenger, then the scenario indicator code may cause the system to issue visual and/or audible warnings that are likely to be noticed by the passenger, as well as the driver. If lane readings from the lane sensor 32 indicate that the host vehicle is drifting out of its lane, then awakening actions performed in this step may be coupled with one or more automated driving actions, such as lane centering. Numerous other combinations and embodiments of awakening actions are possible and within the scope of the present system and method.

The next sub-step $108_2$ waits a certain amount of time, which may be based on the scenario indicator code, before checking on the efficacy or effectiveness of the previous awakening action. For example, if the scenario indicator code indicates that the driver may be potentially nodding off but is still driving acceptably and is on a rural road with no detected vehicles or pedestrians around, then sub-step $108_2$ may give the awakening action from the previous sub-step a slightly longer amount of time to try and rouse or engage the driver, as the likelihood of a collision is somewhat low. In this example, the awakening action is provided a greater opportunity to achieve its goal before escalating to more aggressive measures. Each bit or group of bits in the scenario indicator code can have a predetermined time period associated with it, or there can be a separate bit or group of bits that designates the time period to wait, or all awakening actions can be performed for a set predetermined period of time, to cite three examples. It is possible for the duration or amount of time delay in sub-step $108_2$ to be based on the likelihood of a collision and/or the potential severity of such a collision, such that longer delays are used when there is a lower likelihood and/or low potential severity (gives the driver more time to become reengaged) and shorter delays are used when there is a higher likelihood and/or potential severity of a collision (causes the method to more quickly move to more aggressive remedial actions). Some non-limiting examples of potential time delays are 1-10 seconds. Of course, if the driver's behavior and/or alertness appear to diminish, the method could interrupt this delay and move directly to automated driving actions.

After waiting for the prescribed time period, during which time the method was preferably carrying out the one or more awakening actions, sub-step $108_3$ checks whether the driver is actively engaged in driving. There are a myriad of ways to check whether the driver is actively engaged in driving, including but not limited to, evaluating the eyes, face, head, hands, body, etc. of the driver or monitoring the steering wheel or foot pedals to see if the driver is active and engaged. It is also possible to employ any of the techniques or methods used in step 102 to see if the driver is still impaired or if he or she has been sufficiently roused and awakened. If the driver is now actively engaged in driving, step 108 may end so that the method returns to step 102 for continued monitoring. If the driver still appears to be impaired, the method may proceed to sub-step $108_4$.

Sub-step $108_4$ evaluates the current driving scenario for the likelihood of a collision and/or the potential severity of such a collision and, at least partially based on this evaluation, determines if the method should return to sub-step $108_4$ for additional awakening actions or progress directly to sub-step $108_5$ for more aggressive automated driving actions. The information needed to make this determination may be in the scenario indication code itself, it may be separately gathered from various sensors and other sources in and around the vehicle, or it may be acquired in some other way. If the scenario indicator code contains a single numerical value, as in the exemplary embodiment of FIG. 3, sub-step $108_4$ could compare this value to a predetermined threshold and direct the course of the method based on this comparison. If the scenario indicator code is a multi-bit string, as in the embodiment of FIG. 4, certain bits or groups of bits may be considered when making this evaluation. Sub-step $108_4$ may also consider the number of cycles step 108 has gone through. To illustrate, if step 108 is on its first cycle such that only one set of awakening actions have been performed, the method may be more apt to attempt to try and reengage the driver through the performance of escalated or heightened awakening actions than if step 108 is on its second or third cycle and none of the preceding cycles have been successful. If sub-step $108_4$ determines that the current driving scenario does not warrant automated driving actions, then the method may loop back to sub-step $108_1$ so that a progressive or escalating set of additional awakening actions can be performed. For example, if during a first cycle sub-step $108_1$ carried out awakening actions in the form of visual, audible and/or haptic alerts in an effort to try and rouse the driver, during a subsequent cycle sub-step $108_1$ may perform the same alerts and additionally roll down the driver's window, increase the fan speed of the HVAC system and/or perform some other more noticeable alert in a more affirmative way to awaken the driver. This is an example of an escalating sequence of awakening actions or warnings. Conversely, if the current driving scenario does warrant automated driving actions, then the method continues to sub-step $108_5$.

In sub-step $108_5$, the method initiates, performs and/or otherwise carries out one or more automated driving actions, as described above. Skilled artisans will appreciate that any number of different automated driving actions and combinations of actions could be employed to help mitigate the effects of the impaired driver. According to one potential embodiment, sub-step $108_5$ engages a lane centering feature, sub-step $108_6$ then waits a predetermined amount of time (could be the time periods described above in conjunction with sub-step $108_2$ that are dictated by the scenario indicator code), and then sub-step $108_7$ again checks to see if the driver is adequately engaged in driving (could be the same evaluation described above in conjunction with sub-step $108_3$). Of course, lane centering and other automated driving actions do not typically utilize a single control action followed by a waiting period, but instead entail a series of continuous control actions while that particular feature is being performed or engaged. Each time the method cycles through sub-steps $108_5$-$108_7$ an escalating or increasingly assertive set of automated driving actions could be performed. One possible sequence of automated driving actions includes first engaging the lane centering function, then performing a gradual or slow braking maneuver to safely bring the host vehicle to a slow speed (during this period, the vehicle's hazard lights could be activated), and finally bringing the host vehicle to a safe stop and/or finding a safe place to park the vehicle. Of course, the preceding sequence assumes that the vehicle is on a road where slowing down and eventually stopping is safe and appropriate. The particular combination or sequence of automated driving actions that are performed can be based on the scenario indication code discussed above, as well as numerous other factors.

At any time, if it is determined that the driver is now actively engaged in driving and no longer needs to be awakened, step 108 may end and the overall method could loop back to step 102 for continued monitoring. Awakening actions may or may not be initiated while the at least one automated driving action is being performed. In accordance with one embodiment, all remedial actions remain active until either sub-step $108_3$ or $108_7$ determines that the driver is actively engaged in driving. In accordance with another embodiment, all awakening actions remain active until either sub-step $108_3$ or $108_7$ determines that the driver is actively engaged in driving. It is possible for some combination of awakening and/or remedial actions to continue to be performed, even after sub-steps $108_3$ or $108_7$ determine that the driver is actively engaged and no longer impaired; such a combination of actions may depend on the scenario indicator code or the various criteria discussed above. If the car is not equipped with automated driving capabilities, then the method may simply activate the vehicle's hazard lights or take other precautions to warn nearby drivers, pedestrians, etc.

The following example is for a situation where the host vehicle is being driven on a straight six-lane highway at night with no other vehicles or pedestrians in the area, and the driver appears to be drowsy or otherwise impaired. In such a situation, an audible and/or haptic alert is issued in sub-step $108_1$, a three-five second delay occurs at sub-step $108_2$, the driver is found to not be actively engaged in driving by sub-step $108_3$, the driving scenario does not currently warrant the use of automated driving actions in sub-step $108_4$, and the method returns to sub-step $108_1$ for an escalated or increased set of awakening actions, such as the previously issued audible and/or haptic alert plus rolling the driver's window down, turning up the vehicle's radio to an increasingly loud volume and/or making noticeable adjustments to the HVAC system, for example. Assuming that sub-step $108_3$ finds that the driver is still not actively engaging in driving and that the current driving scenario now warrants the use of automated driving actions at sub-step $108_4$, the method cycles through sub-steps $108_5$-$108_7$ using a progressive or escalating sequence of automated driving actions until the driver is properly awakened or the vehicle is brought to a safe stop. The preceding example is not meant to limit the present method, rather to provide an example of potential sequence of events.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a vehicle control system installed on a host vehicle and having one or more vehicle sensor(s), one or more environment sensor(s), and a control module, the method comprising the steps of:
    detecting an impaired driver;
    gathering sensor readings from at least one of the vehicle sensor(s) or the environment sensor(s) at the control module;
    using the control module and sensor readings from at least one of the vehicle sensor(s) or the environment sensor(s) to develop a customized scenario-dependent response to the impaired driver, wherein the customized scenario-dependent response at least partially depends on a likelihood of collision and/or a potential severity of a collision and includes at least one awakening action or automated driving action to address a current driving scenario and to mitigate the effects of the impaired driver; and
    performing the customized scenario-dependent response.

2. The method of claim 1, wherein the gathering step further comprises gathering speed readings from one or more speed sensor(s) in order to determine at least one of a vehicle speed or acceleration, and the using step further comprises using speed readings from the speed sensor(s) to develop the scenario-dependent response, wherein the scenario-dependent response includes at least one awakening action or automated driving action that addresses the vehicle speed or acceleration when mitigating the effects of the impaired driver.

3. The method of claim 1, wherein the gathering step further comprises gathering navigation readings from a navigation unit in order to determine characteristics of a current road segment, and the using step further comprises using navigation readings from the navigation unit to develop the scenario-dependent response, wherein the scenario-dependent response includes at least one awakening action or automated driving action that addresses the characteristics of the current road segment when mitigating the effects of the impaired driver.

4. The method of claim 1, wherein the gathering step further comprises gathering object readings from one or more object sensor(s) in order to determine a concentration of other vehicles or pedestrians in the area of the host vehicle, and the using step further comprises using the object readings from the object sensor(s) to develop the scenario-dependent response, wherein the scenario-dependent response includes at least one awakening action or automated driving action that addresses the concentration of other vehicles or pedestrians in the area of the host vehicle when mitigating the effects of the impaired driver.

5. The method of claim 1, wherein the using step further comprises using the sensor readings from at least one of the vehicle sensor(s) or the environment sensor(s) to generate a scenario indicator code that is numerical and is representative of certain aspects of the current driving scenario, and using the scenario indicator code to develop the scenario-dependent response.

6. The method of claim 5, wherein the scenario indicator code is generated by starting with a base indicator code representative of a starting or default state of the current driving scenario, and using the sensor readings from at least one of the vehicle sensor(s) or the environment sensor(s) to adjust the base indicator code and arrive at the scenario indicator code.

7. The method of claim 6, wherein previous driving behavior or patterns of the impaired driver influence the base indicator code.

8. The method of claim 6, wherein a time of day or day of the week influences the base indicator code.

9. The method of claim 5, wherein a first sensor reading from a vehicle sensor causes the scenario indicator code to be increased and/or decreased by a first amount and a second sensor reading from an environment sensor causes the scenario indicator code to be increased and/or decreased by a second amount, and the first and second amounts are different so that the first and second sensor readings have a different influence on the scenario indicator code.

10. The method of claim 5, wherein the scenario indicator code is a multi-bit string with a plurality of bits, and each bit or group of bits is representative of a characteristic of the current driving scenario such that the scenario indicator code has a meaningful number format.

11. The method of claim 1, wherein the performing step further comprises performing the scenario-dependent response by issuing one or more visual, audible and/or haptic alert(s) that are designed to awake or rouse the impaired driver.

12. The method of claim 11, the performing step further comprises performing the scenario-dependent response by carrying out a lane centering maneuver at the same time as issuing the visual, audible and/or haptic alert(s).

13. The method of claim 1, wherein the performing step further comprises performing the scenario-dependent response by issuing a miscellaneous alert that includes at least one of the following actions: lowering a driver's window, turning up the volume on a vehicle radio, or increasing the fan speed on a HVAC system.

14. The method of claim 1, wherein the performing step further comprises performing the scenario-dependent response by carrying out one or more automated driving action(s) with at least one of an engine control module, a brake control module or a steering control module.

15. The method of claim 1, wherein the performing step further comprises performing the scenario-dependent response by carrying out a sequence of escalating awakening actions and automated driving actions that are designed to mitigate the effects of the impaired driver.

16. The method of claim 15, wherein the escalating sequence begins with one or more awakening action(s) designed to awake or rouse the impaired driver and then progresses to one or more automated driving action(s) that include at least one of a lane centering maneuver, a light braking maneuver, and an automatic parking maneuver.

17. The method of claim 15, wherein a duration of at least one of the awakening action(s) is based on a scenario indicator code.

18. The method of claim 15, wherein a duration of at least one of the awakening action(s) is based on a likelihood of a collision and/or a potential severity of a collision involving the host vehicle, and the duration is longer when the likelihood and/or the potential severity is lower.

19. A method for use with a vehicle control system installed on a host vehicle and having one or more vehicle sensor(s), one or more environment sensor(s), and a control module, the method comprising the steps of:
  detecting an impaired driver;
  gathering sensor readings from at least one of the vehicle sensor(s) or the environment sensor(s) at the control module;
  using the control module and sensor readings from at least one of the vehicle sensor(s) or the environment sensor(s) to make adjustments to a scenario indicator code that is representative of certain aspects of the current driving scenario;
  using the scenario indicator code to develop a scenario-dependent response to the impaired driver that includes an escalating sequence of awakening actions designed to engage the impaired driver and automated driving actions designed to mitigate the effects of the impaired driver; and
  performing the scenario-dependent response.

20. A vehicle control system installed on a host vehicle, comprising:
  one or more vehicle sensor(s) configured to provide vehicle sensor readings;
  one or more environment sensor(s) configured to provide environment sensor readings;
  one or more output device(s) configured to receive command signals and to initiate a scenario-dependent response when an impaired driver is detected; and
  a control module coupled to the vehicle sensor(s) for receiving the vehicle sensor readings, the environment sensor(s) for receiving the environment sensor readings, and the output device(s) for providing the command signals;
  wherein the control module is configured to develop a customized scenario-dependent response to the impaired driver and to initiate the customized scenario-dependent response with the command signals provided to the output device(s), and the customized scenario-dependent response at least partially depends on a likelihood of collision and/or a potential severity of a collision and includes at least one awakening action or automated driving action to address a current driving scenario and to mitigate the effects of the impaired driver.

21. A method for use with a vehicle control system installed on a host vehicle and having one or more vehicle sensor(s), one or more environment sensor(s), and a control module, the method comprising the steps of:

detecting an impaired driver;

gathering sensor readings from at least one of the vehicle sensor(s) or the environment sensor(s) at the control module;

using the control module and sensor readings from at least one of the vehicle sensor(s) or the environment sensor(s) to generate a scenario indicator code that is numerical and is representative of certain aspects of a current driving scenario, and using the scenario indicator code to develop a scenario-dependent response to the impaired driver, wherein the scenario-dependent response includes at least one awakening action or automated driving action that is customized to address the current driving scenario and to mitigate the effects of the impaired driver; and performing the scenario-dependent response.

* * * * *